United States Patent [19]

Kervagoret et al.

[11] Patent Number: 5,234,030
[45] Date of Patent: Aug. 10, 1993

[54] PRESSURE-REGULATING DEVICE FOR A HYDRAULIC CIRCUIT

[75] Inventors: Gilbert Kervagoret, Argenteuil; Jean-Marc Cheron, Longperrier, both of France

[73] Assignee: Bendix Europe Services Techniques, Drancy, France

[21] Appl. No.: 898,611

[22] Filed: Jun. 15, 1992

[30] Foreign Application Priority Data

Jul. 16, 1991 [FR] France .................. 91 08943

[51] Int. Cl.$^5$ .......................... F15B 13/044
[52] U.S. Cl. .................. 137/596.17; 91/433; 303/119.2
[58] Field of Search ............ 91/433; 137/596.17; 303/119 SV, 119.2

[56] References Cited

U.S. PATENT DOCUMENTS

| | | | |
|---|---|---|---|
| 3,995,652 | 12/1976 | Belart et al. | 137/102 |
| 4,478,250 | 10/1984 | Lukasczyk et al. | 91/433 X |
| 4,643,225 | 2/1987 | Imhof | 91/433 X |
| 4,844,122 | 7/1989 | Ichihashi | 137/625.65 |
| 5,186,093 | 2/1993 | Kervagoret | 137/596.17 X |

FOREIGN PATENT DOCUMENTS

| | | |
|---|---|---|
| 1231514 | 12/1966 | Fed. Rep. of Germany . |
| 530564 | 12/1972 | Switzerland . |
| 970551 | 9/1964 | United Kingdom . |

OTHER PUBLICATIONS

Abstract of Japanese Pub. No. 60-157575, published Aug. 1985.

Primary Examiner—Gerald A. Michalsky
Attorney, Agent, or Firm—Larry J. Palguta; Ken C. Decker

[57] ABSTRACT

The invention relates to a pressure-regulating device for a hydraulic circuit comprising at least one generator (30) of pressurized fluid, a hydraulic motor (28) and a reservoir (32) of fluid under low pressure, and including an electrovalve controlled by a calculator and comprising, in a yoke (8), an electric coil (10) and a sliding magnetic core (12) controlling a slider (16) sliding in a bore provided in a body (18), the slider (16) defining two chambers (22, 36) arranged on either side of the slider (16) in the bore, the slider comprising a hydraulic enclosure (40) communicating with the hydraulic motor (28) and defining a reaction force supplementing the force generated by the coil (10), counter to a prestressed resilient mechanism (20), the enclosure (40) consisting of a blind bore made in the slider (16), a needle (42) closing the enclosure (40) in a substantially leaktight manner, while a radial pierced hole (44) connects it to a groove (34) provided at the periphery of the slider (16). According to the invention, the needle (42) bears on a cup (46) which is stationary with respect to the yoke (8) of the electric coil (10).

12 Claims, 1 Drawing Sheet

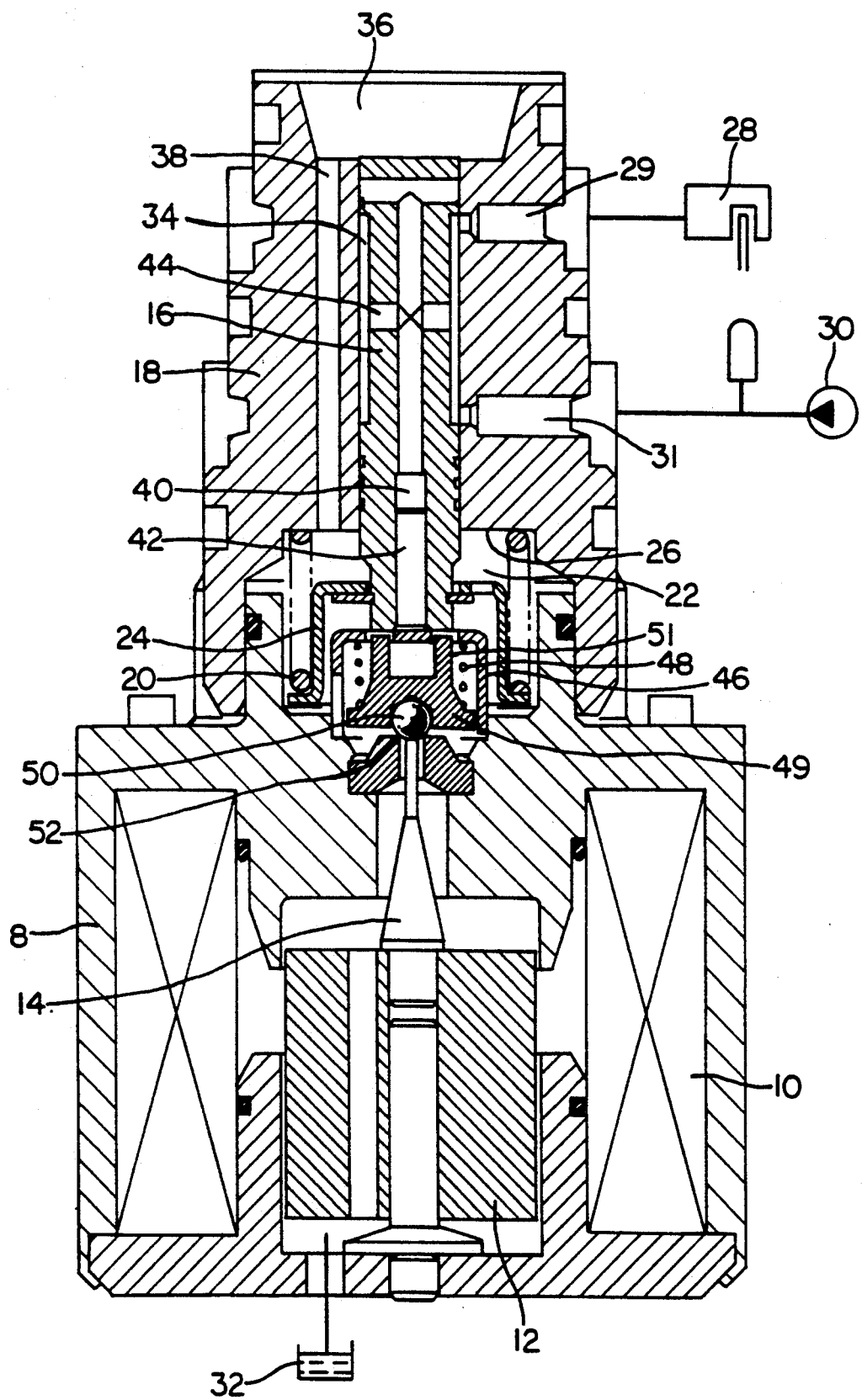

PRESSURE-REGULATING DEVICE FOR A HYDRAULIC CIRCUIT

The invention relates to a pressure-regulating device for a hydraulic circuit.

It is particularly suited to motor vehicle antilock braking systems. Current anti-lock systems employ, between a source of pressurized fluid and a hydraulic receiver such as a brake motor,, an electrovalve controlled by a calculator or control mechanism as a function of signals representative of the rotation of the wheels of the vehicle in order, in a general manner, to release the pressure of the fluid in the hydraulic motor when the calculator detects the imminent locking of a wheel, and then to connect a second source of pressurized fluid to increase the pressure again, until imminent locking is detected again, the cycle then being repeated. Electrovalves of the same type are employed in anti-slip systems to generate a pressure in a brake motor of a driving wheel when the calculator detects a tendency of this driving wheel to slip, and then to release this pressure when the tendency to slip has disappeared.

The electrovalves employed are electrovalves operating in all-or-nothing mode. Now the anti-lock or anti-slip periods where cycles such as those described above succeed one another last for a very short period of time during which the electrovalve changes states very many times. This causes a disagreeable hammering noise from the moveable part of the electrovalve.

Moreover, since the system operates in all-or-nothing mode, surges in pressure occur in the brakes, giving rise to transient, poorly controlled operating conditions.

The object of the present invention is to overcome these disadvantages by employing a so-called proportional electrovalve which provides in the downstream circuit a hydraulic pressure which is a function of the current circulating in the coil of the electrovalve within a specified range of displacement of the magnetic core of the electrovalve.

Such an electrovalve then has the advantage of being able to be controlled simply by varying the current circulating in the coil, without necessitating any hammering of the moveable part; a considerable reduction in the surges in pressure in the brakes thus results. Furthermore, such an electrovalve can easily be controlled by a calculator chopping, at variable frequency a continuous current such as is found on board a motor vehicle, or alternatively chopping at a fixed frequency and at a variable cyclic ratio, the intensity of the current induced by the coil then being a function of the cyclic ratio.

Such an electrovalve is, for example, described in U.S. Application No. 4,744,389. However, the electrovalve described in this document cannot be arranged in a hydraulic anti-lock braking circuit owing to the pressures employed, in particular during the excitation of the electrovalve. Indeed, the electrovalve of this document is designed in order to operate permanently in a system for regulating a relatively low pressure. This physical limitation therefore precludes the use of such an electrovalve with high pressures in the hydraulic motor. Furthermore, this electrovalve does not allow the pressure to be increased linearly when the current decreases linearly in the coil, and vice versa.

One object of the present invention is to provide an electrovalve allowing the pressure to be varied linearly as a function of the current in the coil, which can be excited with a high pressure in the hydraulic circuit, and which has a simple design and mounting.

The subject of the present invention is therefore a pressure-regulating device for a hydraulic circuit comprising at least one generator of pressurized fluid, a hydraulic motor and a reservoir of fluid under low pressure, and including an electrovalve controlled by a calculator and comprising, in a yoke, an electric coil and a sliding magnetic core controlling a slider sliding in a bore provided in a body, the slider defining two chambers arranged on either side of the slider in the bore, the slider comprising a hydraulic enclosure communicating with the hydraulic motor and defining a reaction force supplementing the force generated by the coil, counter to a prestressed resilient means, the enclosure consisting of a blind bore made in the slider, a needle closing the enclosure in a substantially leak tight manner, whilst a radial pierced hole connects it to a groove provided at the periphery of the slider.

According to the invention, the needle bears on a cup which is stationary with respect to the yoke of the electric coil. This cup is preferably integrally connected to the yoke.

The invention will now be described by way of example with reference to the accompanying drawings in which:

The single figure illustrates diagrammatically in section an embodiment of a device according to the present invention in the rest position.

It is known that the coil of so-called proportional electravlaves has the essential feature of being able to supply a substantially constant force for a specified current within a not inconsiderable range of displacement of the magnetic core, of the order of 2 to 3 mm. This feature is in general obtained by virtue of a particular geometry of the pole pieces. This feature is employed in the present invention to perform the function required by modulation of the current circulating in the coil in order to avoid operation with very rapid hammering of a moveable part.

In the figure, such an electrovalve can be seen comprising, in a yoke 8, an exciting coil 10, and a sliding magnetic core provided with its pusher 14 bearing on a slider 16 sliding in a bore of a body 18. A prestressed spring 20 is arranged in a chamber 22, for example between a cup 24 integrally connected to the slider 16, and a wall 26 of the body 18, in order to stress the slider 16 toward its rest position.

The slider 16 is machined so as to be able to open or close a communication between a downstream hydraulic receiver 28 connected to a duct 29, a source of pressurized fluid 30 connected to a duct 31, and a reservoir 32 in accordance with the generally employed systems for regulating hydraulic pressure. In order to do this, a groove 34 is provided at the periphery of the slider 16.

The two chambers 22 and 36 situated on either side of the slider 16 in the bore are at the same pressure by means of a pierced hole 38 made in the body 18. An enclosure 40, consisting of a blind bore made in the slider 16, defines on the slider a reaction force supplementing the force generated by the coil 10. This enclosure 40 is closed in a substantially leaktight manner by a needle 42 and communicates with the groove 34 by means of a radial pierced hole 44.

This needle 42 bears on a cup 46 which is stationary with respect to the yoke 8 of the coil 10 and is, for example, force-fitted into this yoke. The cup 46 also serves as a support for the slider 16 and defines its rest position. Lastly, the cup 46 serves as a support for a return spring 48 of a valve 49 with a ball 50 interacting with a seat 52 formed on the yoke 8. By virtue of this advantageous arrangement, all the components of the electrovalve are assembled solely by movement in an axial direction, and there is no longer any need for pins and other transverse stops.

In the rest position, as shown, the source of pressurized fluid 30 is in communication with the hydraulic motor 28 via the groove 34, and the enclosure 40 is in communication with the motor 28. The two end chambers 22 and 36 communicate with each other and are isolated from the reservoir 32 by the valve 50 resting on its seat 52.

When the electrovalve is excited, for example during a wheel anti-lock period in the preferred field of application of the invention, firstly the current circulating in the coil generates a force opposing that of the spring 48 in order to lift the ball 50 off its seat 52 and open the communication between the chamber 22 and the reservoir 32, and then opposes the force of the servo-control spring 20, the valve 49 carrying on its periphery fingers 51 which are regularly distributed and penetrate into corresponding orifices in the cup 46 in order to act on the slider 16. The force is exerted by the pusher 14 counter to that of the spring 20 irrespective of the pressure prevailing in the hydraulic circuit. This enables, in particular, the electrovalve not to consume very much electricity. The opening of the valve 50, 52 and the bringing of the chambers 22 and 36 into communication with the reservoir 32 takes place before the current in the coil 10 has reached its nominal intensity. Then, the intensity being nominal, the valve 49 abuts the slider 16, the movement of which, counter to the spring 20, closes the duct 31, thus isolating the source of pressurized fluid 30 from the motor 28. By virtue of the position of the groove 34, the latter communicates with the chamber 36 and, consequently, with the reservoir 32. A release of the pressure of the fluid in the motor is therefore produced. It will have been understood that the movement of the slider 16 counter to the spring 20 is generated by the current in the coil 10 and is promoted by the hydraulic reaction in the enclosure 40 which generates a force supplementing that produced by the coil and opposed to that generated by the servo-control spring 20. By reducing the intensity of the current in the coil, the pressure having fallen in the motor 28, the hydraulic reaction force due to the enclosure 40 decreases, and the slider is displaced in the other direction, closing again the communication between the motor 28 and the chamber 36, and hence the reservoir 32, and then reestablishing, if necessary, the communication between the source 30 and the motor 28, permitting a rise in the pressure in the motor 28. If the intensity of the current in the coil is increased, the pressure again falls in the motor 28, since the communication between the motor and the reservoir 32 via the groove 34 and the chambers 22 and 36 is reopened.

It can therefore be seen that an increase in the current in the coil results in a decrease in the pressure of the fluid in the motor 28. It can then be seen that by modulating, for example by chopping, the curing circulating in the coil 10, the slider 16 assumes a position which is a function of the pressure prevailing in the enclosure 40, and it is possible, by carefully controlling this current, to apply the desired fluid pressure to the motor 28. Indeed, the hydraulic reaction generated in the enclosure 40 automatically opens or closes the communications between the motor 28 and the source of pressurized fluid 30, and between the motor 28 and the reservoir 32, for each specified value of the intensity of the current circulating in the coil 10.

Furthermore, owing to the arrangement of the bearing cup 46 for the needle 42 and the slider 16, the device of the invention is particularly simple to assemble and disassemble, and hence to maintain.

Although only one embodiment of the invention has been described, it is clear that the person skilled in the art will be able to make numerous modifications to it without going beyond the scope of the invention, as defined by the attached claims.

I claim:

1. A pressure-regulating electrovalve for a hydraulic circuit comprising at least one generator of pressurized fluid, a hydraulic motor and a reservoir of fluid under low pressure, said pressure-regulating electrovalve being controlled by a control mechanism and comprising;

an electric coil and a sliding magnetic core arranged in a yoke;

a body provided with a bore in which is arranged a slider slidable by said sliding magnetic core under a force generated by said coil counter to resilient means;

a hydraulic enclosure comprising a blind bore in the slider, said blind bore in communication with the hydraulic motor through a radial hole of the slider and a peripheral groove of said slider;

a needle closing said hydraulic enclosure in substantially leaktight manner, the pressure of fluid in said hydraulic enclosure defining a reaction force supplementing the force generated by the coil, and a stationary cup serving as a support for both the needle and a return spring of a ball valve controlled by said sliding magnetic core.

2. The electrovalve according to claim 1, wherein the cup is integrally connected with the yoke.

3. The electrovalve according to claim 1, wherein the cup defines a rest position of the slider.

4. The electrovalve according to claim 1, wherein the ball valve is arranged between the reservoir and one of two chambers defined by the slider and is closed when the electric coil is not excited so as to isolate the hydraulic circuit from the reservoir.

5. The electrovalve according to claim 4, wherein said ball valve comprises fingers penetrating into corresponding orifices in the cup in order to be engageable with the slider.

6. The electrovalve according to claim 5, wherein the resilient means comprises at least one spring housed in one of said chambers.

7. The electrovalve according to claim 4, wherein said chambers communicate with each other.

8. A pressure-regulating electrovalve for a hydraulic circuit comprising at least one generator of pressurized fluid, a hydraulic motor and a reservoir of fluid under low pressure, said pressure-regulating electrovalve being controlled by a control mechanism and comprising:

an electric coil and a sliding magnetic core arranged in a yoke;

a body provided with a bore in which is arranged a slider slidable by said sliding magnetic core under a force generated by said coil counter to resilient means;

a hydraulic enclosure comprising a blind bore in the slider, said blind bore in communication with the hydraulic motor through a radial hole of the slider and a peripheral groove of said slider;

a needle closing said hydraulic enclosure in substantially leaktight manner, the pressure of fluid in said hydraulic enclosure defining a reaction force supplementing the force generated by the coil, and a cup integrally connected to the yoke, the cup defining a rest position of the slider and serving as a support for both the needle and a return spring of a ball valve controlled by said sliding magnetic core.

9. The electrovalve according to claim 8, wherein the ball valve is arranged between the reservoir and one of two chambers defined by the slider and is closed when the electric coil is not excited so as to isolate the hydraulic circuit from the reservoir.

10. The electrovalve according to claim 9, wherein said ball vale comprises fingers penetrating into corresponding orifices in the cup in order to be engageable with the slider.

11. The electrovalve according to claim 10, wherein the resilient means comprises at least one spring housed in one of said chambers.

12. The electrovalve according to claim 9, wherein said chambers communicate with each other.

* * * * *